(12) United States Patent
Robinson, Jr.

(10) Patent No.: US 11,752,919 B2
(45) Date of Patent: Sep. 12, 2023

(54) DEVICE AND METHOD FOR SECURING CARGO

(71) Applicant: Cardinal Logistics Management Corporation, Concord, NC (US)

(72) Inventor: Charles Douglas Robinson, Jr., Davidson, NC (US)

(73) Assignee: Cardinal Logistics Management Corporation, Concord, NC (US)

(*) Notice: Subject to any disclaimer, the term of this patent is extended or adjusted under 35 U.S.C. 154(b) by 72 days.

(21) Appl. No.: 17/680,959

(22) Filed: Feb. 25, 2022

(65) Prior Publication Data

US 2022/0176866 A1 Jun. 9, 2022

Related U.S. Application Data

(63) Continuation-in-part of application No. 16/914,667, filed on Jun. 29, 2020, now Pat. No. 11,260,787.

(60) Provisional application No. 62/868,020, filed on Jun. 28, 2019.

(51) Int. Cl.
*B60P 7/08* (2006.01)

(52) U.S. Cl.
CPC .................. *B60P 7/0815* (2013.01)

(58) Field of Classification Search
CPC .. B60P 1/52; B60P 7/08; B60P 7/0815; B65D 90/00; B65D 88/12; B65G 69/04
USPC ....... 410/105, 102, 104, 150, 144, 143, 145, 410/146
See application file for complete search history.

(56) References Cited

U.S. PATENT DOCUMENTS

| | | | | |
|---|---|---|---|---|
| 1,597,091 A * | 8/1926 | McMahan | ............ | B61D 45/006 410/144 |
| 2,877,602 A | 3/1959 | Larsen | | |
| 5,807,047 A * | 9/1998 | Cox | .......................... | B60P 1/00 410/152 |
| 6,722,829 B2 * | 4/2004 | Williams | .................. | B60P 7/15 410/139 |

(Continued)

FOREIGN PATENT DOCUMENTS

| | | |
|---|---|---|
| DE | 4019011 A1 | 12/1991 |
| EP | 1028868 B1 | 8/2000 |

OTHER PUBLICATIONS

International Search Report/Written Opinion issued by the U.S. Patent & Trademark Office as International Searching Authority dated Sep. 15, 2020 for corresponding application No. PCT/US2020/040058; 17 pages.

(Continued)

*Primary Examiner* — Amy R Weisberg
*Assistant Examiner* — Sunsurraye Westbrook
(74) *Attorney, Agent, or Firm* — Smith Gambrell & Russell LLP

(57) ABSTRACT

A device and method for securing cargo to vertical logistics posts on a side of a transportation vehicle. The device comprises a rail with a plurality of slots, an adjustable slide for adjusting the overall horizontal length of the device to fit between irregularly spaced gaps of parallel vertical logistics posts, and clips that are inserted and removably retained in corresponding receiving spaces of vertical logistics posts. Cargo is secured to the device through the slots on the rail. The device provides ease of relocation and adjustment for irregular gaps between vertical logistics posts.

15 Claims, 18 Drawing Sheets

(56) References Cited

U.S. PATENT DOCUMENTS

| | | | | |
|---|---|---|---|---|
| 8,028,845 B2* | 10/2011 | Himes | ............... | A47B 47/021 |
| | | | | 211/103 |
| 8,117,970 B1 | 2/2012 | Baez | | |
| 8,701,902 B2 | 4/2014 | Oura | | |
| 9,572,271 B2* | 2/2017 | Mills | ............... | G01M 99/005 |
| 9,834,130 B1 | 12/2017 | Peters | | |
| 11,097,647 B1* | 8/2021 | Moore | ............... | B60P 7/0815 |
| 2008/0035588 A1* | 2/2008 | Liang | ............... | H05K 7/1489 |
| | | | | 211/26 |
| 2008/0308515 A1 | 12/2008 | Lange | | |
| 2009/0317205 A1* | 12/2009 | Heng | ............ | B60P 7/15 |
| | | | | 410/52 |
| 2011/0290746 A1* | 12/2011 | Lu | ............ | H05K 7/1489 |
| | | | | 211/183 |
| 2013/0136556 A1* | 5/2013 | Bose | ............ | B60P 7/08 |
| | | | | 410/32 |
| 2014/0191527 A1 | 7/2014 | Riley | | |
| 2018/0022263 A1* | 1/2018 | Meyers | ............ | B61D 45/001 |
| | | | | 410/145 |

OTHER PUBLICATIONS

The Communication Pursuant to Rule 114(2) EPC dated Nov. 28, 2022 for corresponding European Application No. 20833678.4; 5 pages.
Allsafe Made in Germany Seit 1964 Product Information brochure, 11 pages.
Allsafe Made in Germany Seit 1964 Product Information brochure, 7 pages.

* cited by examiner

DEVICE AND METHOD FOR SECURING CARGO

CROSS-REFERENCE TO RELATED APPLICATIONS

This application claims priority to United Stated patent application Ser. No. 16/914,667, filed on Jun. 29, 2020, which will issue into U.S. Pat. No. 11,260,787 on Mar. 1, 2022, which claims priority to U.S. Provisional Patent Application No. 62/868,020 filed on Jun. 28, 2019, all of which is relied upon and incorporated herein in their entirety by reference.

FIELD OF THE INVENTION

The present disclosure relates to logistics devices for securing cargo within a transportation vehicle.

BACKGROUND OF THE INVENTION

The present invention relates to logistics cargo post accessories. Existing horizontal logistics devices are bolted to the sides of the transportation vehicle and do not allow for adjustments based on cargo size and shape. Further, existing devices are designed for the downward force associated with supporting logistics bars which are added to accommodate additional pallet levels and/or for restraint strapping that goes all the way across the transportation vehicle.

There is a need for a device that allows users to safely and easily secure cargo to a side of a transportation vehicle that accounts for horizontal forces. Further, there is a need for a device that offers unlimited configurations for various sized cargo.

SUMMARY OF THE INVENTION

The invention is directed to a logistics device used in transportation vehicles. More specifically, the invention is directed to a movable and adjustable logistics device that can be relocated horizontally in relation to parallel vertical logistics posts to allow ease in securing various sized cargo to the inside of a transportation vehicle such as a trailer.

Transportation vehicles (e.g., trailers, containers, etc.) can include vertical logistics posts used to help secure cargo during shipping. The vertical logistics posts can be used to create several different levels of storage within a transportation vehicle. Many transportation vehicles are configured with vertical logistics posts that are used to secure the cargo. In many instances, the vertical logistics posts are permanently secured to the sides of the transportation vehicles at regular intervals of 24, 36, 48 or 50 inches.

Cargo comes in many shapes and sizes and must be secured when transported. Currently, static horizontal and vertical logistics devices, which are bolted to a side of the transportation vehicle or vertical logistics posts, are available. There is a significant need for an adjustable/movable solution for securing various sizes of cargo to the sides of a transportation vehicle without the need to unbolt and re-bolt the horizontal logistics devices with each load.

The device includes a rail with clips configured to slot into receiving spaces of logistics posts and an adjustable slide for adjusting the overall length of the device. The device offers a tie down solution for securing cargo and the clips allow the device to be easily relocated to new positions along the logistics posts for efficient cargo loading and securement.

In an aspect, the movable and adjustable logistics device comprises a rail with vertically oriented slots, clips at its lateral ends and an adjustable slide. In such aspects, the adjustable slide is coupled to the rail and configured to remain in communication with and abut the rail as it slides out, extending the length of the device. In another aspect, the clips can be spring loaded. The logistics device is available in various lengths to fit across the standard 24/36/48 inch gaps between vertical logistics posts and is adjustable for non-standard gaps. The clips are inserted into receiving spaces of two parallel vertical logistics posts and secure the movable and adjustable logistics device to the vertical logistics posts in a horizontal position. In an aspect, the movable and adjustable logistics device has two clips, each located at a lateral/horizontal end of the rail of the logistics device. In an exemplary aspect, the logistics device is configured to fit across a gap of 46 inches between two vertical logistics posts and the adjustable slide allows the user to extend the rail of the logistics device to fit a gap of up to 51 inches. Cargo can then be strapped or secured to the logistics device through the slots along the rail.

The movable and adjustable logistics device can easily be moved and reconfigured based on the size and shape of each cargo load, providing horizontal cargo securement at any height. The movable and adjustable logistics devices can be adjusted/relocated up, down, forward, or backward in relation to the transportation vehicle opening. The movable and adjustable logistics device can also be removed without damage to the integrity of the transportation vehicle. A driver with irregular truckload cargo can reconfigure the interior cargo securement in minutes with ease with the logistics device.

DETAILED DESCRIPTION

Figure 1:
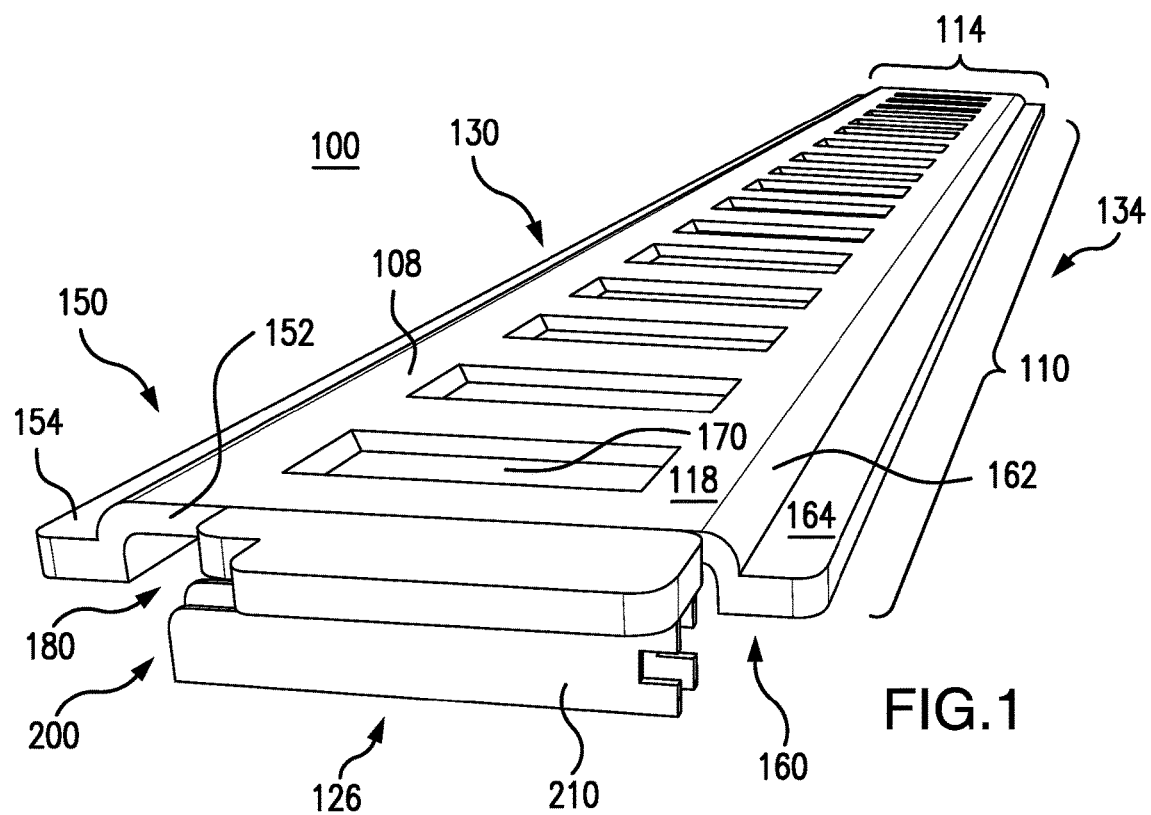
FIG. 1 is a perspective view of a movable and adjustable logistics device according to an aspect of the present invention.
Figure 2:
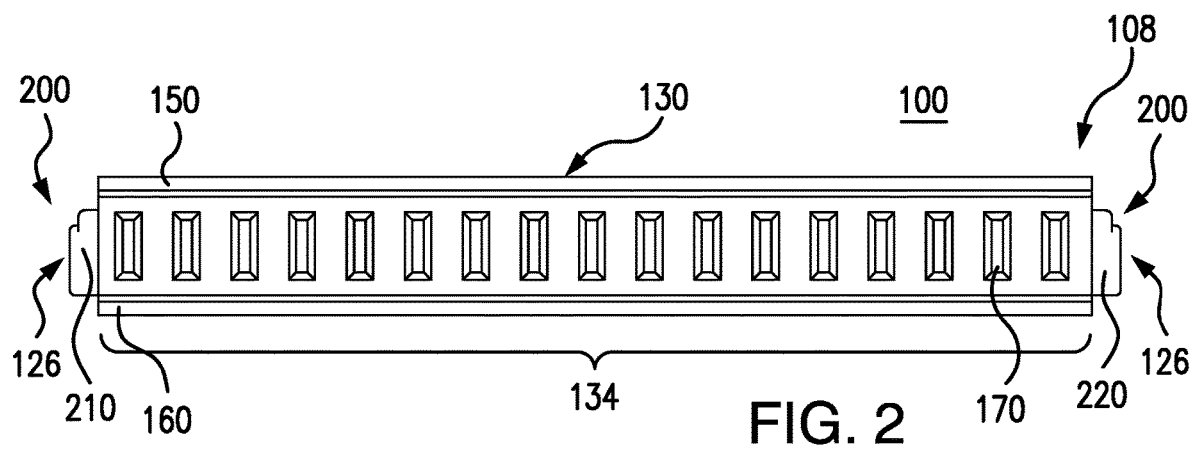
FIG. 2 is a top plan view of the movable and adjustable logistics device of FIG. 1.
Figure 3A:
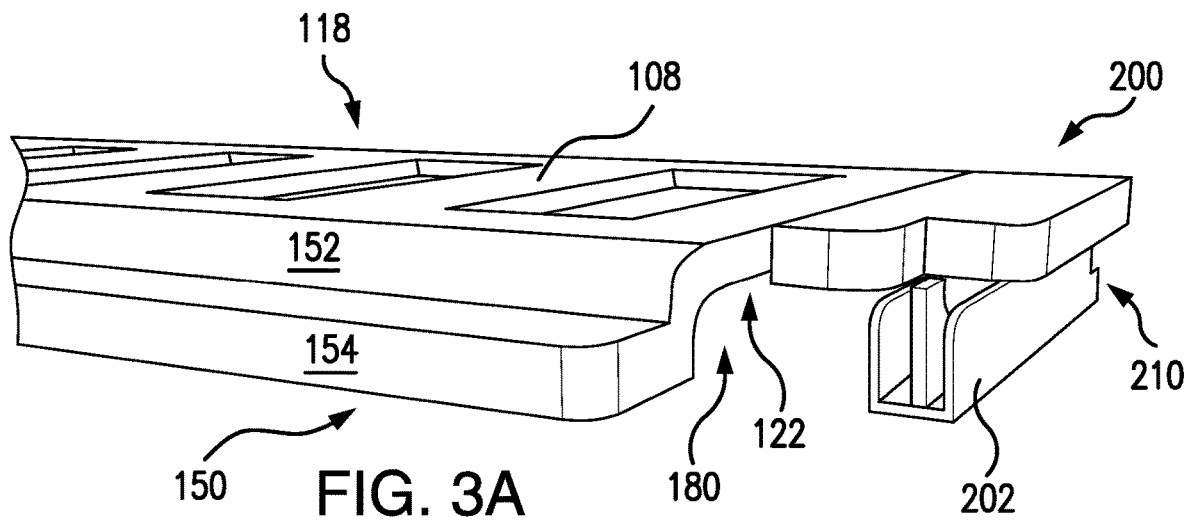
FIGS. 3A-3B are perspective views of a clip at a lateral end of the movable and adjustable logistics device of FIG. 1.
Figure 3B:
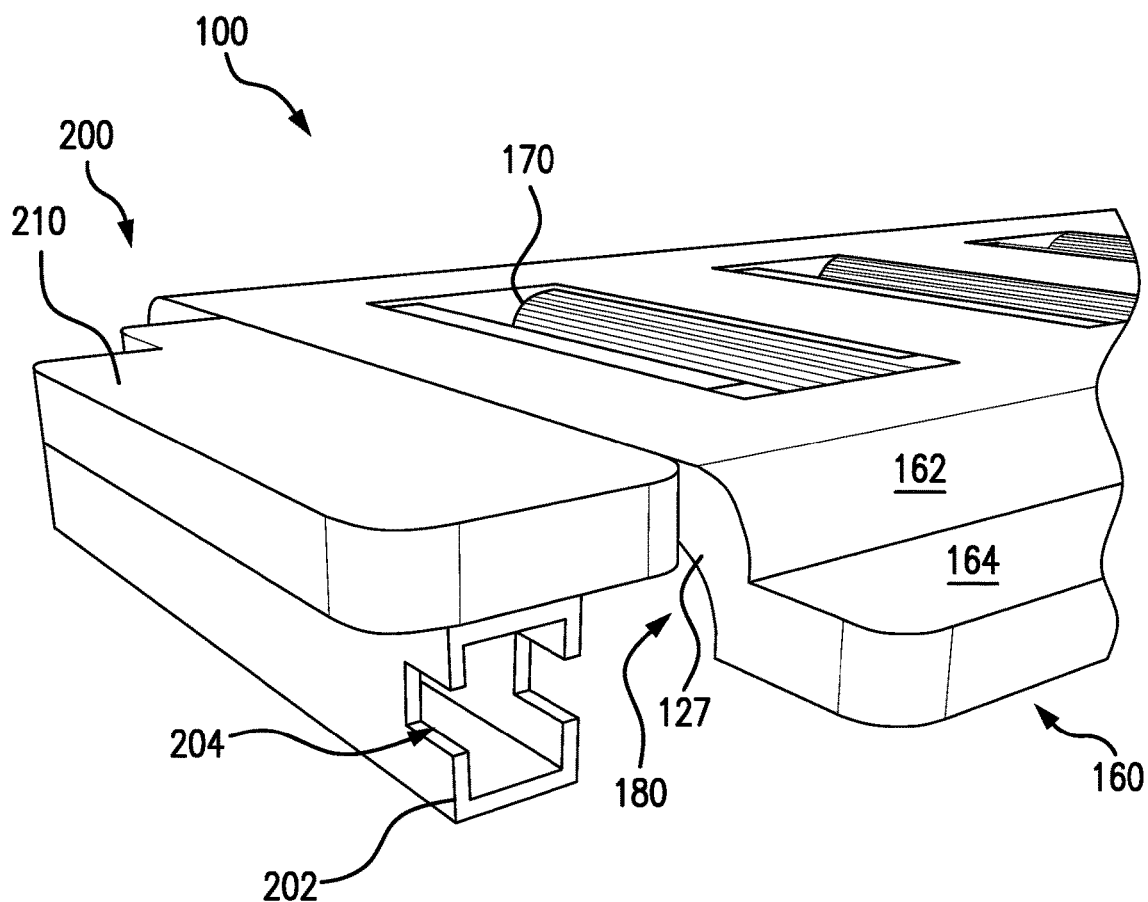
Figure 4:
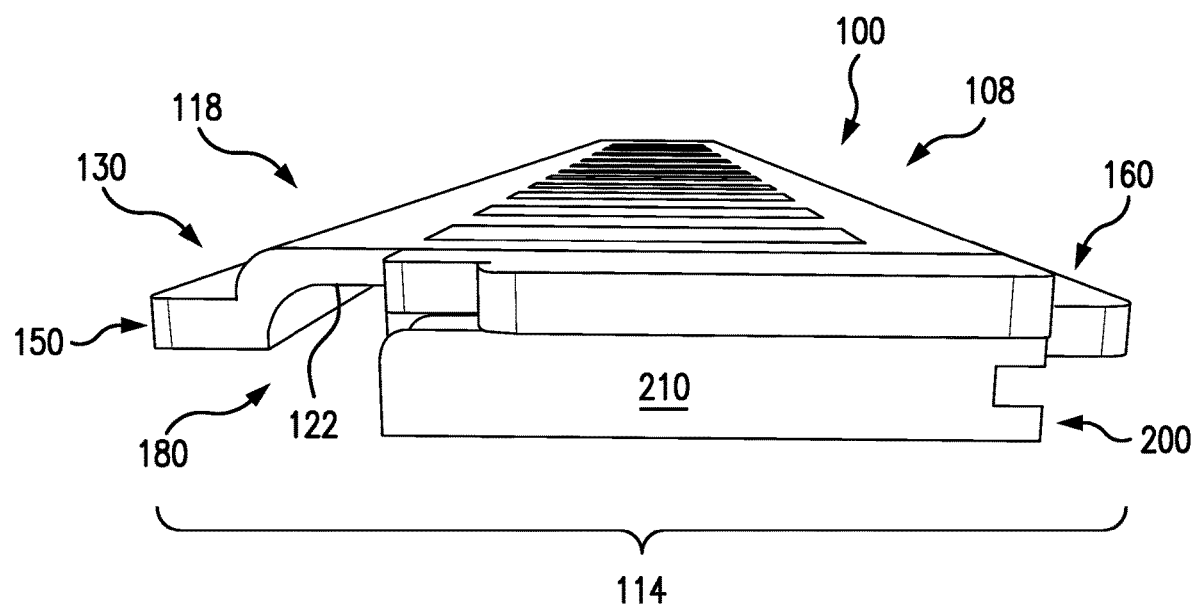
FIG. 4 is a side view of the movable and adjustable logistics device of FIG. 1.
Figure 5:
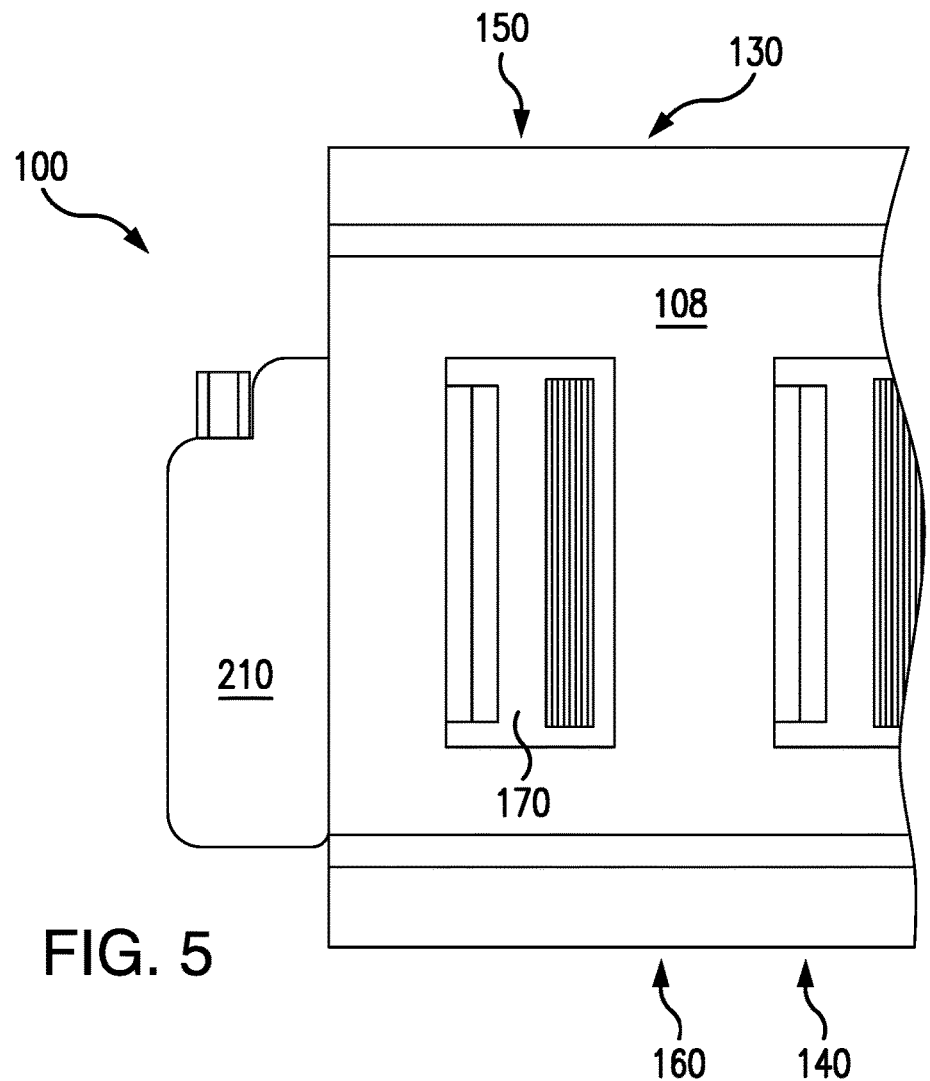
FIG. 5 is a top view of a portion of the movable and adjustable logistics device of FIG. 1.
Figure 6:
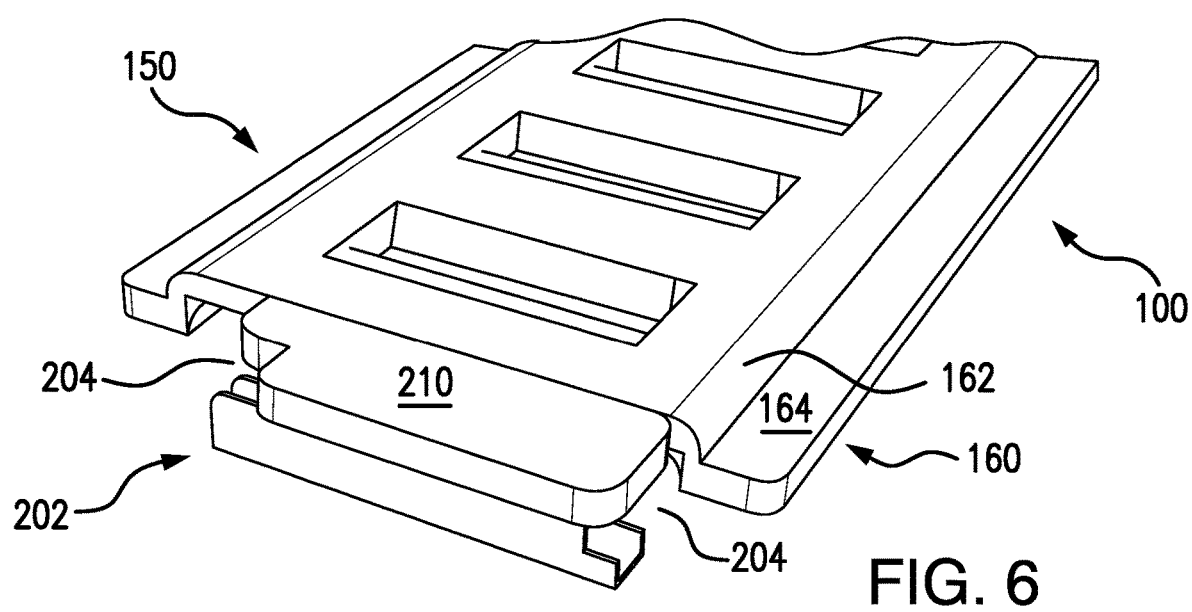
FIG. 6 is a side perspective view of a portion of the movable and adjustable logistics device of FIG. 1.

Embodiments of the invention will be described more fully hereinafter with reference to the accompanying drawings, in which embodiments of the invention are shown. This invention may, however be embodied in many different forms and should not be construed as limited to the embodiments set forth herein; rather, these embodiments are provided so that this disclosure will be thorough and complete, and will fully convey the scope of the invention to those skilled in the art.

The present invention, as shown in FIGS. 1-29, is directed to a movable and adjustable logistics device 100. The movable and adjustable logistics device 100 is configured to be used as a horizontal logistics device 100 that can be mounted to vertical logistics posts 300 within transportation vehicles. The transportation vehicles include rail cars, box trucks, containers that can be mounted on trucks, rails, or cargo ships, and other similar vehicles/containers. In most aspects, the vertical logistics posts 300 are fixed to a wall of the transportation vehicles. However, in some instances, the vertical logistics posts 300 can be moved. In either case, the movable and adjustable logistics device 100 can be used with either types of vertical logistics posts 300.

In an aspect, the movable and adjustable logistics device 100 includes a rail 108, clips 200, and an adjustable slide 230. In such aspects, the clips 200 can be found at lateral/horizontal end(s) 126 and the adjustable slide 230 of the device 100 and can slot into receiving spaces 310 of vertical logistics posts 300. In an aspect, the device 100 has a first clip 210 and a second clip 220 which slot into corresponding parallel receiving spaces 310 of vertical logistics posts 300. Optionally, the device 100 may comprise more than two clips 200, allowing the user to secure the device 100 to more than two logistics posts 300. In such aspects, one of the clips 200 can be found on a back side of the rail 108. In another embodiment, the device 100 may be mounted vertically across two horizontal logistics posts, or e-tracks. In such embodiments, the alignment of the clips and the slots have to be the same as implemented, as discussed below in more detail. The components of the device 100, such as the rail 108 and the adjustable slide 230 and the clips 200, may be made from steel but they may also be made from a metal alloy, reinforced hard plastic and other materials. While various materials that can be utilized, it is preferable that a metal alloy or other material that has a high tensile strength to withstand the force of secured cargo during transit over repeated use without functional damage or failure.

As shown in FIGS. 1-11, and discussed above, the adjustable and movable logistics device 100 comprises a rail 108 with a length 110 and a width 114, and a front surface 118 and a back surface 122. The rail 108 includes a top portion 130 and a bottom portion 134. The rail 108 of the device 100 can be provided in lengths 110 of 24, 36 and 48 inches, corresponding with typical gaps 320 between parallel vertical logistics posts 300 (see FIGS. 7-8) mounted to the side 340 of a transportation vehicle. The device 100 can include an adjustable slide 230 for extending the overall length of the device 100 to easily fit between irregularly spaced vertical logistics posts 300, discussed in detail below.

The dimensions of the movable and adjustable logistics device 100 may vary. In an exemplary embodiment, the length 110 of the device 100 is 45 and $^{15}/_{16}$ inches and the width 114 of the device 100 is 3 and ⅝ inches. Vertically oriented rectangular slots 170 (running up and down across the width) measuring 2 and $^{7}/_{16}$ inches long and $^{11}/_{16}$ inches wide spaced 2 inches apart and are disposed along the length 110 of the rail 108. In other aspects, the slots 170 may have other shapes and be oriented horizontally and in other configurations. The slots 170 are used to secure cargo to the side 340 of a transportation vehicle using hooks, hangers, buckle straps, belts, ratchet straps and the like. The slots 170 are configured to be compatible with typical accessories used to secure cargo within transportation vehicles. The slots 170 should provide spaces through which accessories for securing cargo can be attached and detached with ease. In an aspect, the device 100 may be between ¾" to 1" thick. The thickness of the device 100 ensures stability and integrity while in use.

Additionally, in an aspect, the rail 108 of the movable and adjustable logistics device 100 includes a top flange 150, extending from the top portion 130, and a bottom flange 160, extending from the bottom portion 134. The flanges 150, 160 include curved portions 152, 162 that extend into flat portions 154, 164 that stabilize the device 100 when attached to logistics posts 300. The flat portions 154, 164 are in contact with and lie flush against the side 340 of the transportation vehicle. The curvature of the curved portions 152, 162 of the flanges 150, 160 provide space for the slide 230 and clips 200. In addition, when mounted between vertical logistics posts 300, a gap 180 between the back surface 122 of the rail 108 and the side 340 of the transportation vehicle adjacent the rail 108 provides a space/gap 180 through which accessories for securing cargo such as hooks, hangers, additional clips attached to D-rings, buckle straps, belts, ratchet straps and the like can be received to secure cargo to the side 340 of the transportation vehicle. For example, the securing accessories can be passed through the slots 170 into the gap behind the rail 108.

In an aspect, the vertical logistics posts 300 include universal E-tracks. The vertical logistics posts 300 may be installed along the vertical length of a side 340 of a vehicle giving the user the ability to secure cargo at any vertical level within the transportation vehicle. The vertical logistics posts 300 have receiving spaces 310 along their height. The vertical logistic posts 300 may be installed parallel to one another around the interior walls 340 of the transportation vehicle. The vertical logistics posts 300 may bolted to the side 340 of the transportation vehicle.

In an aspect, as shown in FIGS. 9A-10B, the movable and adjustable logistics device 100 includes an adjustable slide 230 coupled to the rail 108. The slide 230 can be movably adjusted in a horizontal position, (i.e., sliding in and out), extending or reducing the length 110 of the device 100. The slide 230 is configured to remain in communication with and abut the back surface 122 of the rail 108.

In an aspect, as shown in FIGS. 9A-10B, the adjustable slide 230 may comprise a substantially flat rectangular insert 232, a tray or other type of insert. In an aspect, the tray 232 includes length-wise sides 234 and width-wise sides 236. In such aspects, the length-wise sides 234 are configured to slidably engage the flanges 150, 160 of the rail 108. The adjustable slide 230 may be made from the same material as the rail 108, such as steel, or it may be made from a different material such as a metal alloy, hard or reinforced plastic. Regardless of the configuration of the adjustable slide 230, the adjustable slide 230 is configured to securely fit into and/or abut the rail 108 of the movable and adjustable logistics device 100 as it slides inward to decrease the horizontal length of the device 100 and outward to extend the overall horizontal length of the device 100. In an aspect, the rail 108 and adjustable slide 230 may comprise 11 gauge steel. In another aspect, the rail 108 and adjustable slide 230 may comprise 12 gauge steel. In an aspect, the length 234 of the slide 230 can vary, determinate on the strength needed for the overall functionality of the device 100. For example, a shorter slide 230 increases the overall strength of the device 100.

In another aspect, the movable and adjustable logistics device 100 may include a support member 400 (See FIGS. 9A-B and 10A-B) in communication with a portion of the device/rail 100, 108 which supports and guides the adjustable slide 230 as it is movably adjusted in relation to the device 100 to extend or reduce its length 110. The support member 400 can include a flat rectangular member 400 that is securely connected to the back surface 122 of the rail 108, retaining the adjustable slide 230 within the flanges 150, 160 of the rail 108. In an aspect, the slide 230 also includes a stopping tab 240 aligned on one of the width-wise sides 236 that prevents the slide 230 from extending too far and retains the slide 230 within the rail 108 at the support member 400. In other words, the stopping tab 240 prevents the slide 230 from exiting the rail 108. A clip 220, discussed in detail below, can be found on the opposite end of the slide 230 from the stopping tab 240, preventing the slide 230 from exiting the rail 108 at the other end. The support member 400 stabilizes the device 100 and prevents the adjustable slide 230 from moving vertically with respect to the device 100 while in use. In an aspect, the slide 230 is configured to move freely within its restricted range of movement on the back of the rail 230—that is, the slide 230 can slide horizontally freely until stopped. In other aspects, the slide 230 and the supporting member 400 is configured to be adjustably positioned along the restricted horizontal range of motion. For example, the supporting member 400 can include several notches to receive a releasable tab connected to the slide 230. Adjustable fasteners can be used as well.

In an aspect, the movable and adjustable logistics device 100 can also include additional strengthening means. For example, a strengthening plate 450 can be added to the backside 122 of the rail 108 to further strengthen the rail 108, as shown in FIGS. 9A-D.

Figure 11:
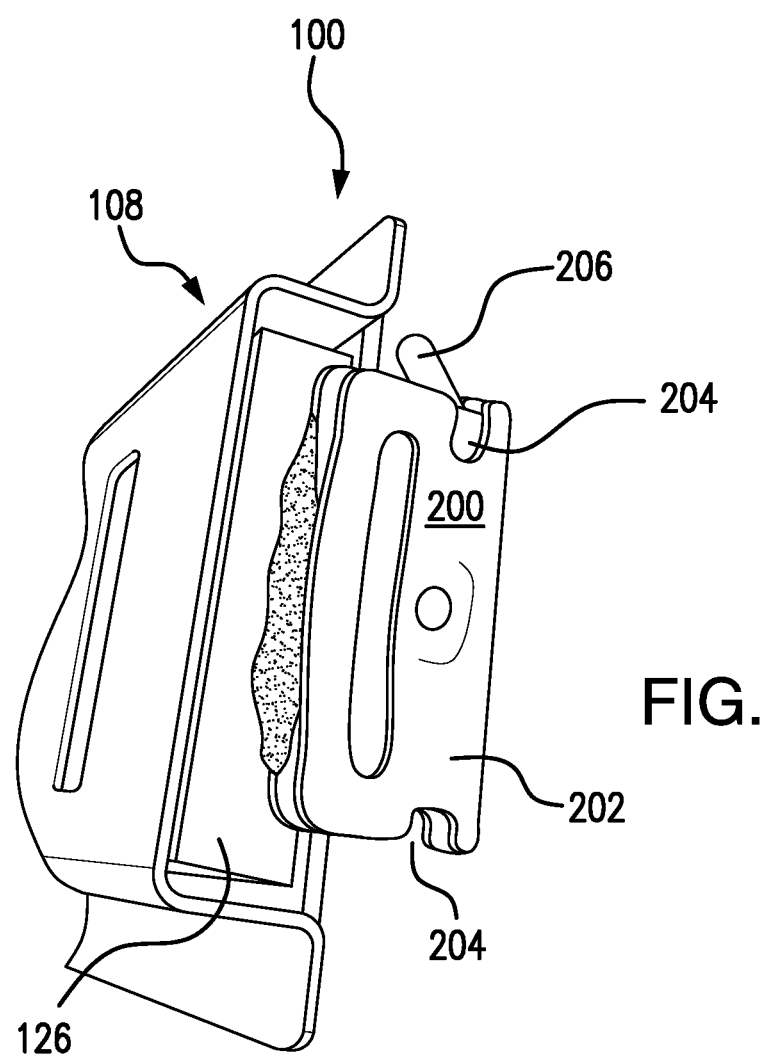
FIG. 11 is a perspective view of a clip at an end of a movable and adjustable logistics device featuring notches and a tab/extension according to an aspect of the present invention.
Figure 12:
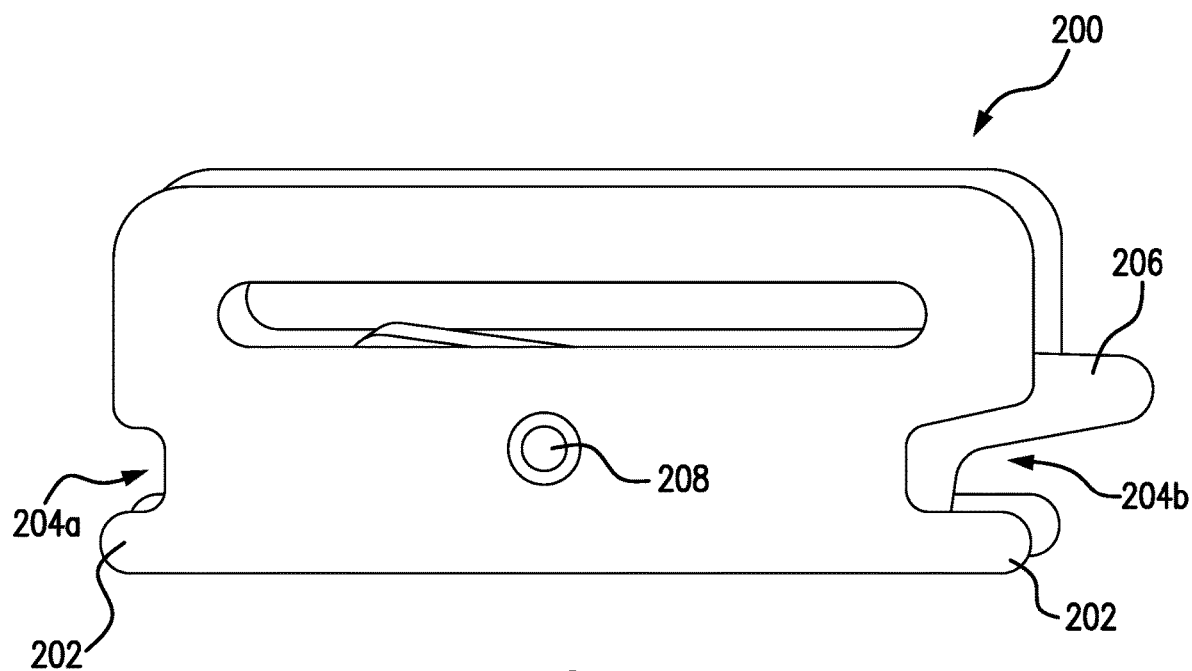
FIG. 12 is a side plan view of a spring loaded clip utilized by a movable and adjustable logistics device according to an aspect of the present invention.
Figure 13:
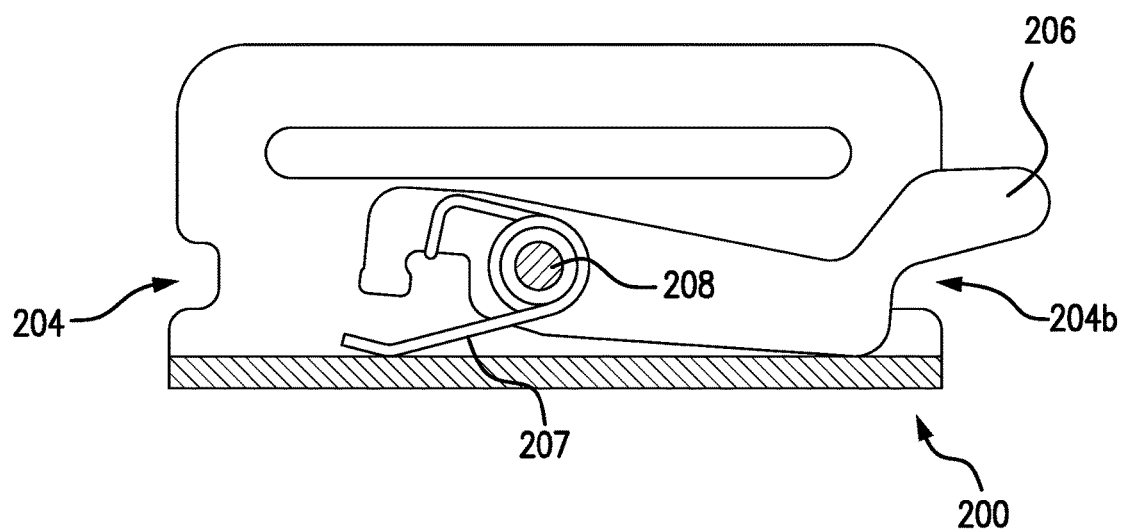
FIG. 13 is a cross-sectional view of the spring-loaded clip of FIG. 12.

The movable and adjustable logistics device 100 also includes clips 200, as discussed above. The device 100 includes a first clip 210 and a second clip 220. The first clip 210 and the second clip 220 can be coupled to the lateral ends 126 of the rail 108. In an aspect, when the device 100 includes an adjustable slide 230, one clip 210 can be attached to a lateral end 126 of the rail 108 and the second clip 220 may be coupled to/attached to the adjustable slide 230 at the width-wise side 236 opposite the stopping tab 240. The clips 200 can include spring-loaded clips or other types of clips. In an aspect, the clips 200 may be detachable. In another aspect, the clips 200 may be permanently attached to the device 100 at the slide 230 and lateral end 126. For example, the clips 210, 220 can be welded onto the respective portions of the rail 108 and the adjustable slide 230. In other aspects, the clips 2000 can be made to detachably couple with the rail 108 and the adjustable slide 230. In an aspect as shown in FIG. 11-13, the clips 200 include tabs 202 that are configured to be received in the receiving spaces 310 of the vertical logistics posts 300. In such aspects, the tabs 202 can include notches 204 that engage the receiving spaces 310 of the vertical logistics posts 300. In an aspect, as shown in FIGS. 11-13, the clip 200 can include a spring loaded clip 200. In such aspects, the clip 200 can include tabs 202 and notches 204, with a fixed notch 204a and an adjustable notch 204b associated with a spring loaded member 206. The spring loaded member 206 is pivotably mounted 208 within an interior portion of the clip 200. A spring 207 biases the loaded member 206 to form an adjustable notch 204b. The member 206 can be pulled back to enlarge the adjustable notch 204b upon insertion within the receiving space 310 of the vertical logistics post 300. When released, the spring 207 forces the spring loaded member 206 to narrow the notch 204b and engage the receiving space 310. Regardless of the type, the clips 200 should be configured to be easily inserted and removed from the receiving spaces 310 of the vertical logistics posts 300.

Figure 7:
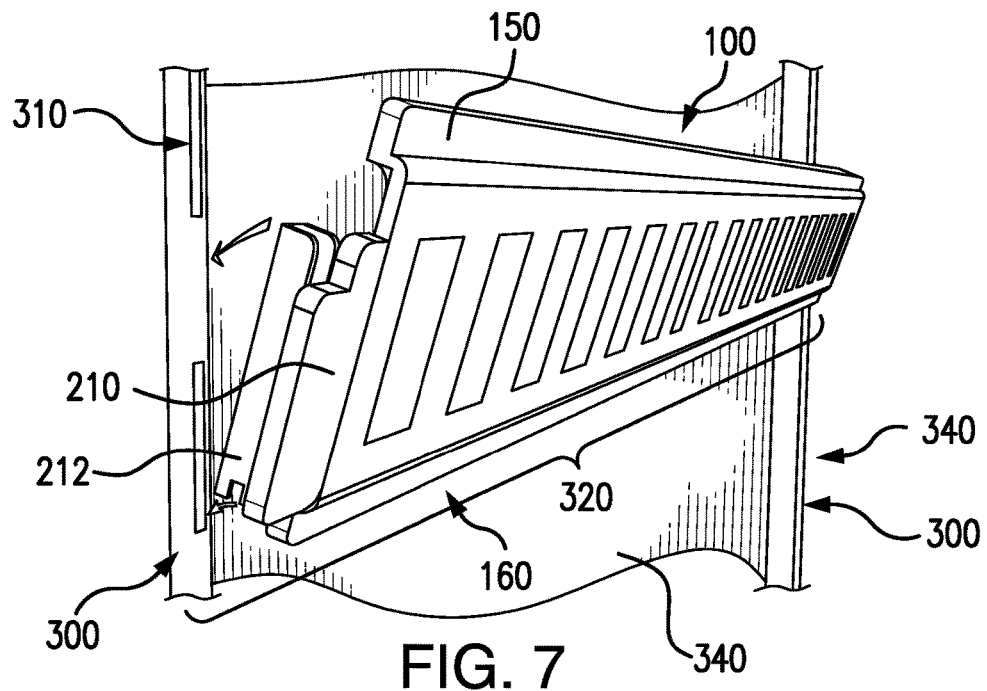
FIG. 7 is a side perspective view of a movable and adjustable logistics device and the vertical logistics posts according to an aspect of the present invention.
Figure 8:
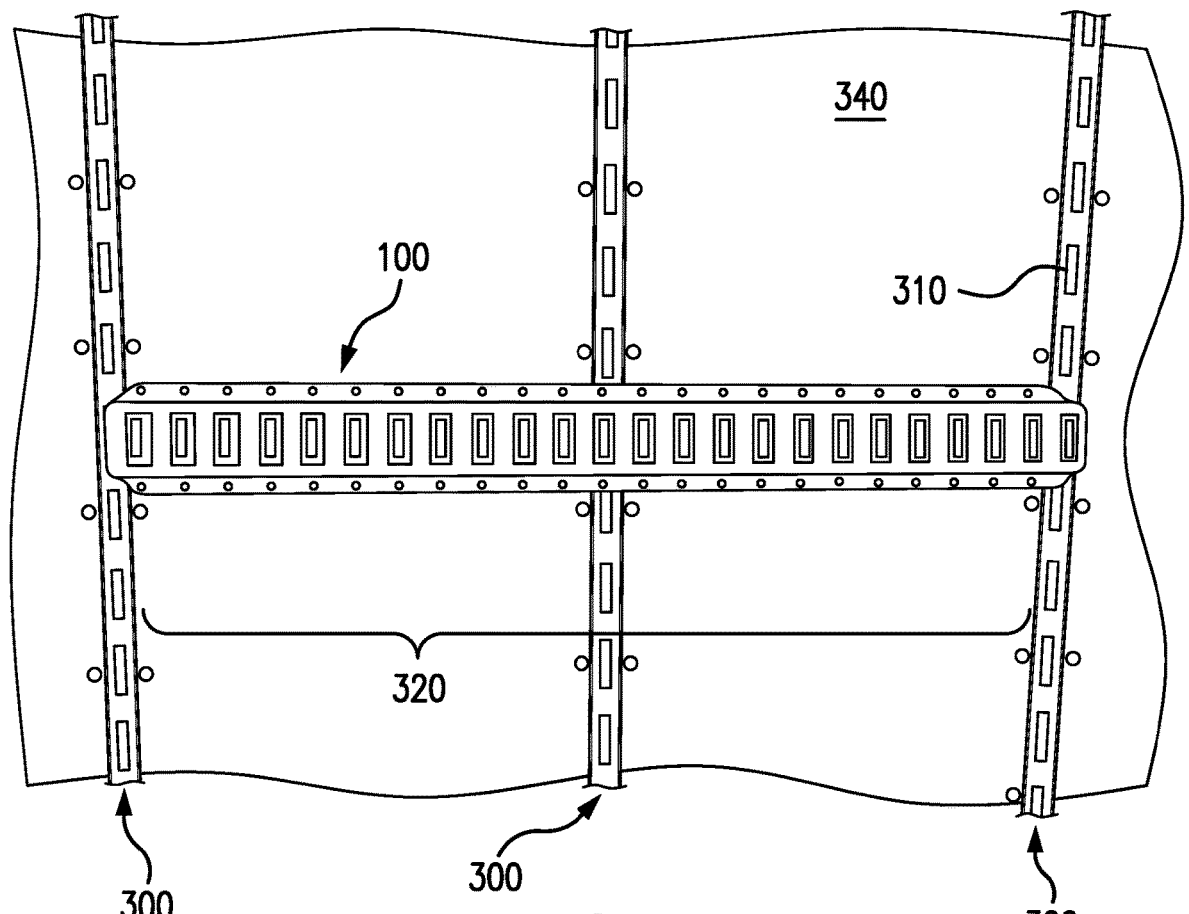
FIG. 8 is a plan view of a movable and adjustable logistic device inserted into vertical logistics posts according to an aspect of the present invention.
Figure 9A:
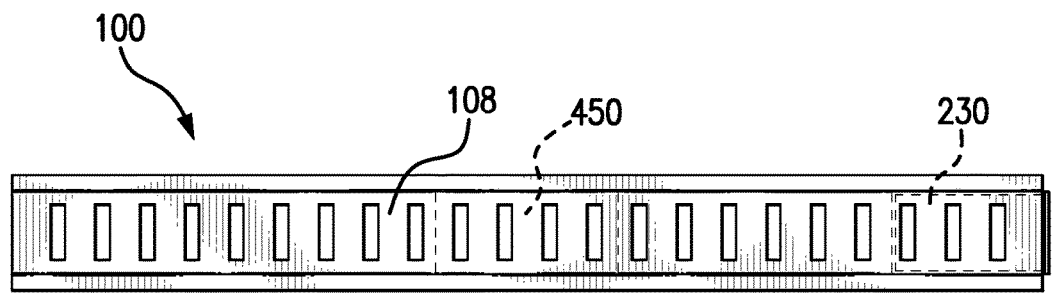
FIGS. 9A-9E are views of a movable and adjustable logistics device including clips and an adjustable slide separated from the device according to an aspect of the present invention.
Figure 9B:
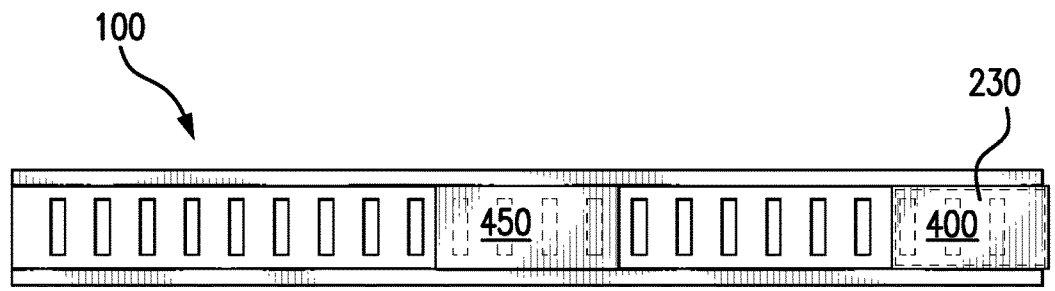
Figure 9C:
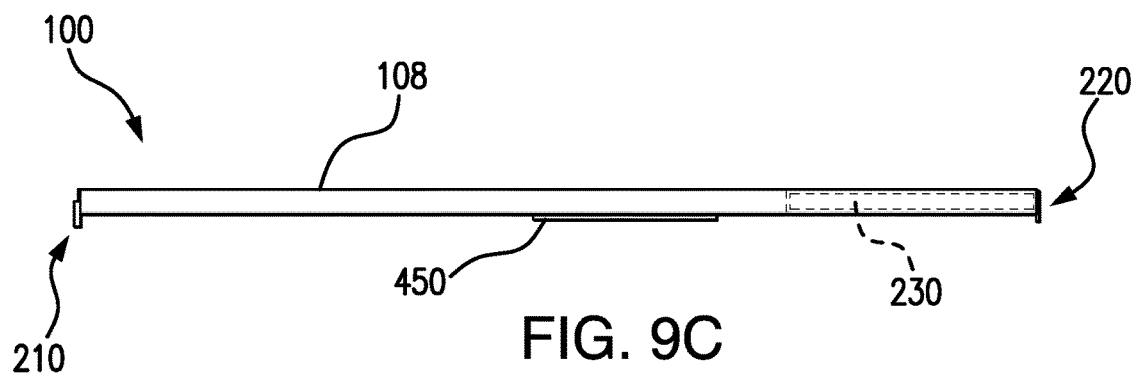
Figure 9D:
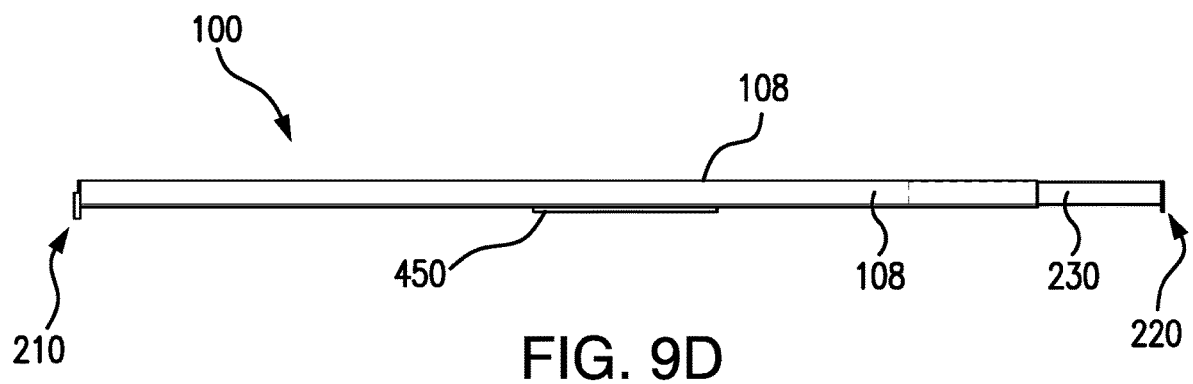
Figure 9E:
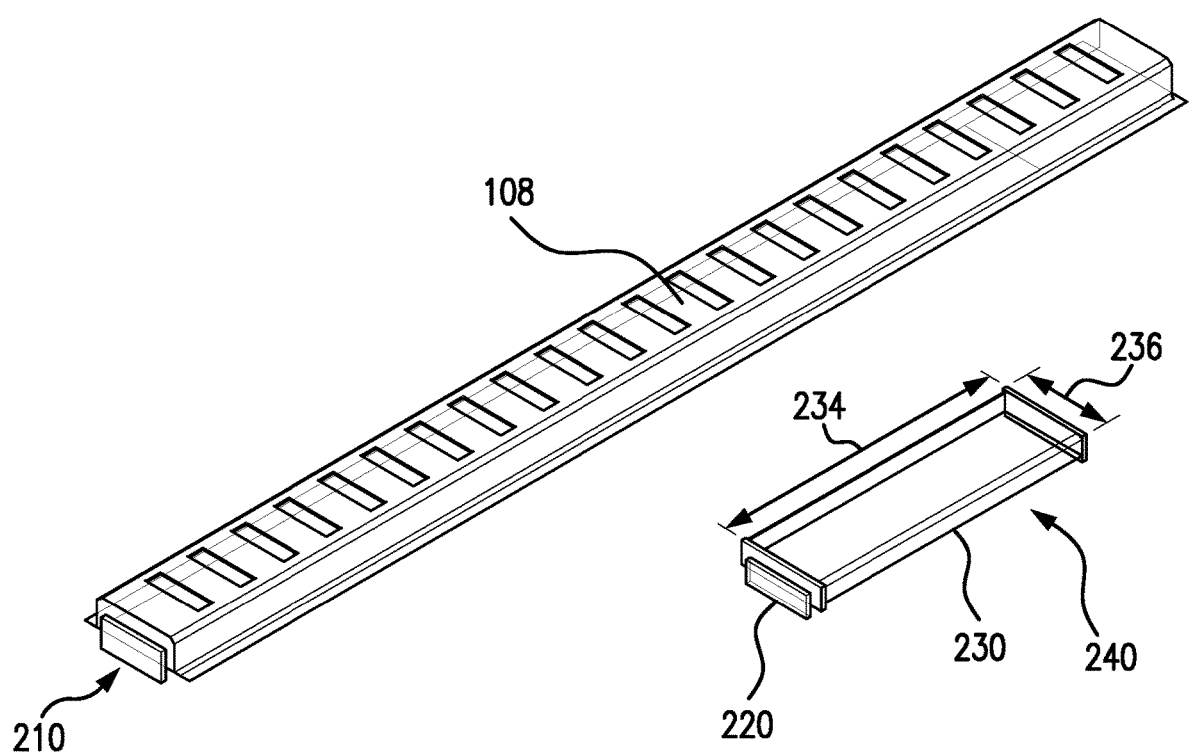
Figure 10A:
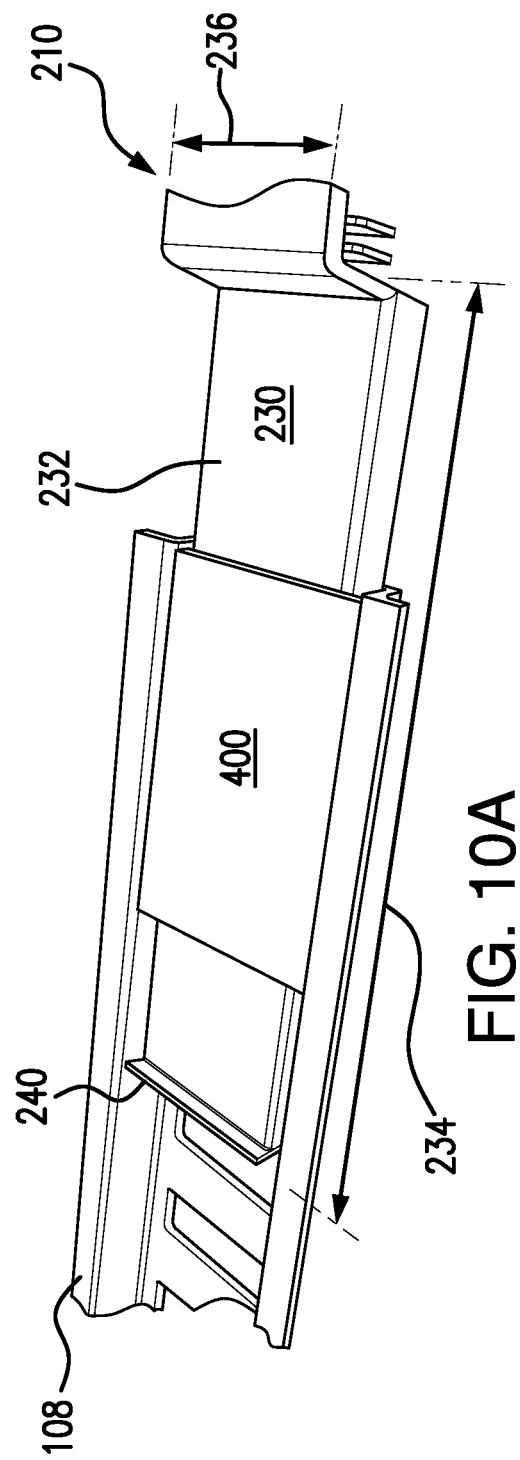
FIGS. 10A-10B illustrate perspective views of an adjustable slide and clips of a movable and adjustable logistics device according to an aspect of the present invention.
Figure 10B:
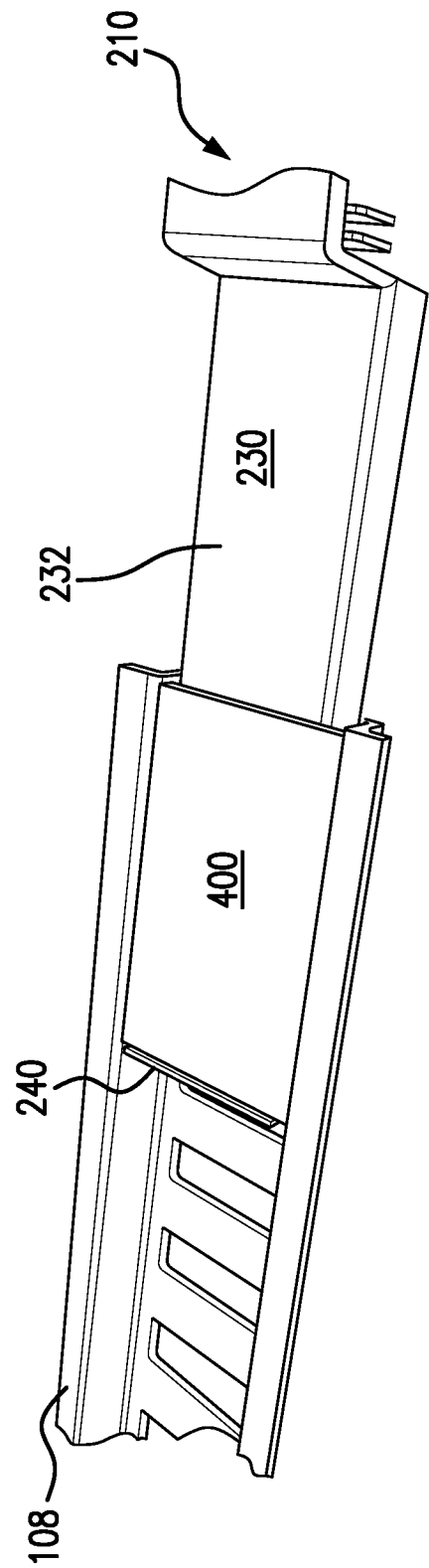

In an exemplary embodiment, two vertical logistics posts 300 are bolted to a side 340 of a transportation vehicle leaving a gap 320 between the two posts 300. To use the movable and adjustable logistics device 100, the user can adjust the slide 230 so that the clips 210, 220 are in alignment with the receiving spaces 310 of the two adjacent vertical logistics posts. In cases in which the length of the gap 320 equals the length of the device 100 without extending the slide 230, the slides do not need to be adjusted. In cases in which the gap 320 does not equal the width of the device 100 without extending the slide 230, the slide 230 can be adjusted so that the clips 210, 220 align correctly with the receiving spaces 310 of the vertical logistics posts 300. Once the clips 210, 220 are aligned correctly, the user can insert a first clip 210 and a second clip 220 into corresponding parallel receiving spaces 310 of two vertical logistics posts 300 as illustrated in FIG. 7. To relocate the device 100 to a different place, the user may apply force or press on the first clip 210 and second clip 220 to detach/release them from their locations, and adjust the slide 230 if needed.

Figure 14:
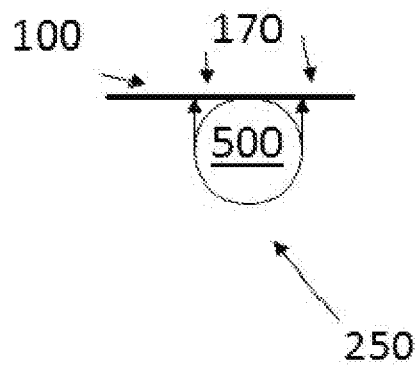
FIGS. 14-17 are schematic views of cylindrical units being secured with movable and adjustable logistic devices according to various aspects of the present invention.
Figure 15:
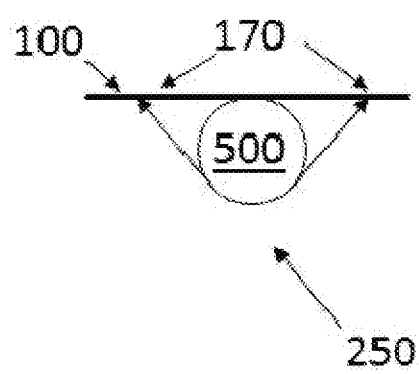
Figure 16:
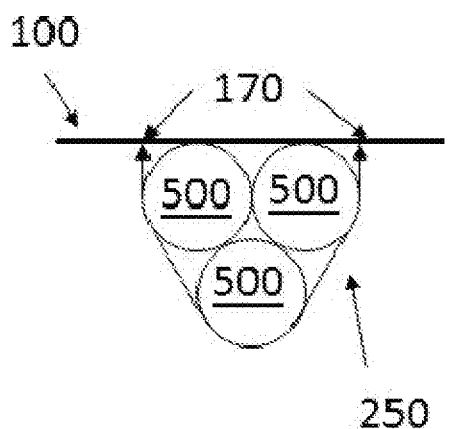
Figure 17:
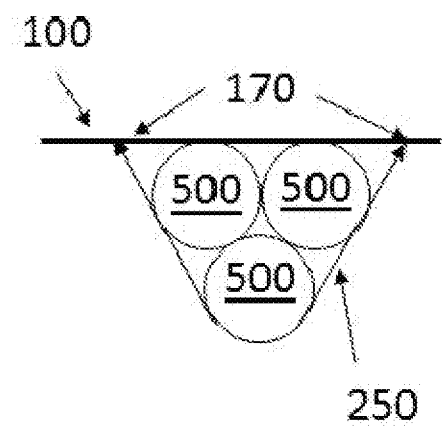
Figure 18:
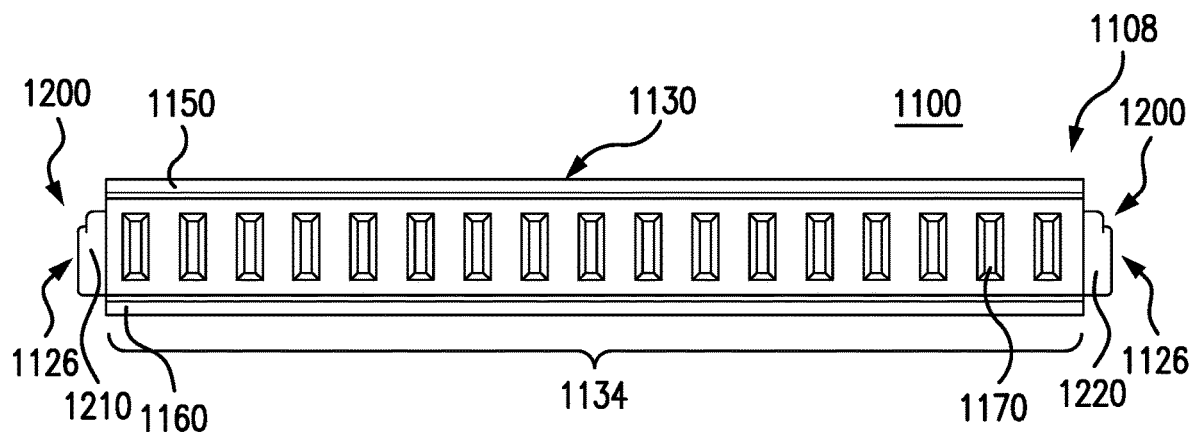
FIG. 18 is a top plan view of the movable and adjustable logistics device configured to use a rotatable clip.
Figure 19:
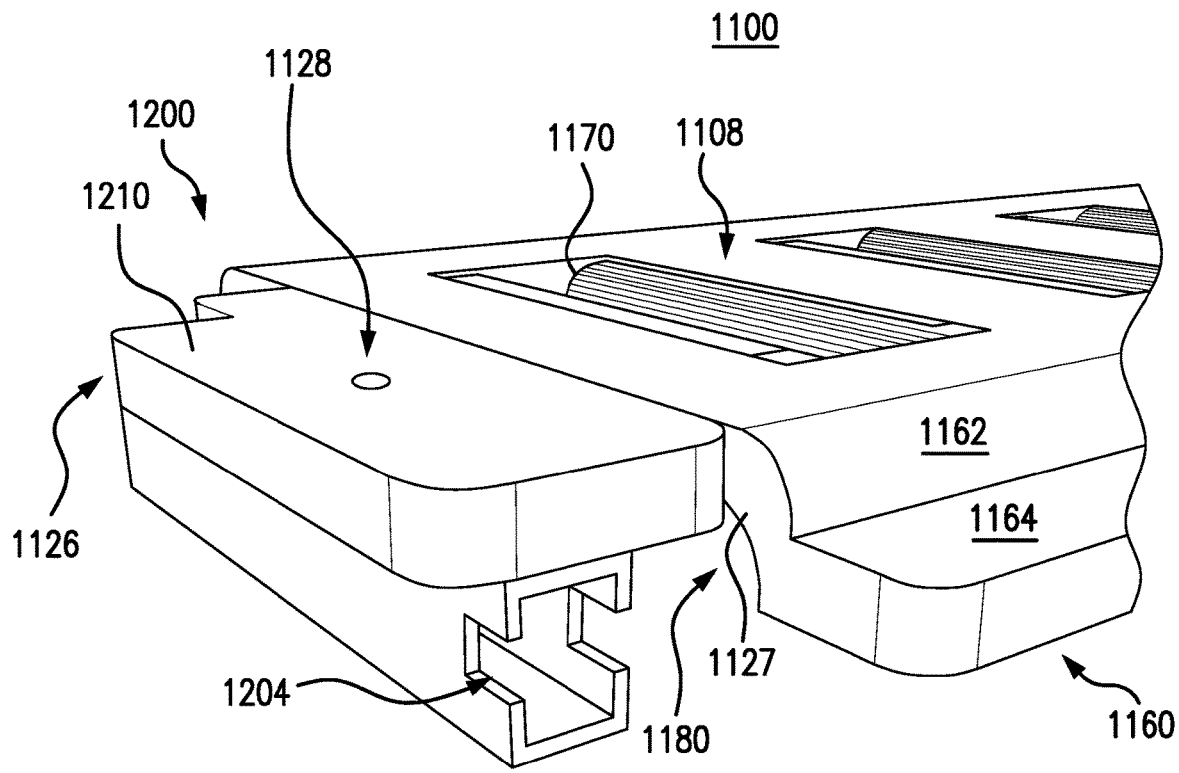
FIG. 19 is a cross-sectional view of the movable and adjustable logistics device configured to use a rotatable clip.

The movable and adjustable logistics device 100 provides more flexibility for users to securely store goods within transportation vehicles. As discussed above, by providing multiple slots 170, the horizontal logistics device 100 provides multiple mounting locations for various ways of securing units. FIGS. 14-17 illustrate how cylindrical units 500 can be secured with a combination of horizontal logistics devices 100 with straps 250 according to an aspect of the present invention. As shown in FIG. 14-15, cylindrical units 500 can be secured with straps 250 within the slots 170 of the horizontal logistics devices 100 in at least two different ways. As shown in FIG. 14, a strap 250 can be secured to the horizontal logistics device 100 in slots 170 almost immediately adjacent to the unit 500. FIG. 15 shows a strap 250 secured in slots 170 of the horizontal logistic device 100 not immediately adjacent to the unit 500. Similarly, multiple cylindrical units can be secured together in a number of ways with the horizontal logistic device 100. FIG. 16 illustrates three cylindrical units 500 being secured with a strap 250 at slots 170 adjacent the units 500, whereas FIG. 17 illustrates the three units 500 secured by a strap 250 mounted in gaps not immediately adjacent the units 500.

In an aspect, a movable and adjustable logistics device 1100 can be configured to have pivoting mounting means, as shown in FIGS. 18-29. In such an aspect, the movable and adjustable logistics device 1100 includes many of the same features of the movable and adjustable logistics device 100 as shown in FIGS. 1-17. For instance, the device 1100 may comprise vertically oriented rectangular slots 1170, a top portion 1130, a bottom portion 1134, and other such elements. In such aspects, the movable and adjustable logistics device 1100 can include clips 1200 that are connected to the rail 1108 in a pivoting matter. The ability of the clip 1200 to swivel/pivot in relation to the rail 1108 of the movable and adjustable logistics device 1100 provides the ability to engage both the vertical slots 310 of vertical parallel logistic posts 300 (as displayed in FIG. 8) as well as the vertical slots 1010 of horizontal logistic posts, or e-tracks, 1000 (as displayed in FIG. 25). The movable and adjustable logistics device 1100 may also swivel/pivot to engage vertical slots 310 that are not in-line as to create a diagonal use of the invention (as displayed in FIG. 26).

Figure 20A:
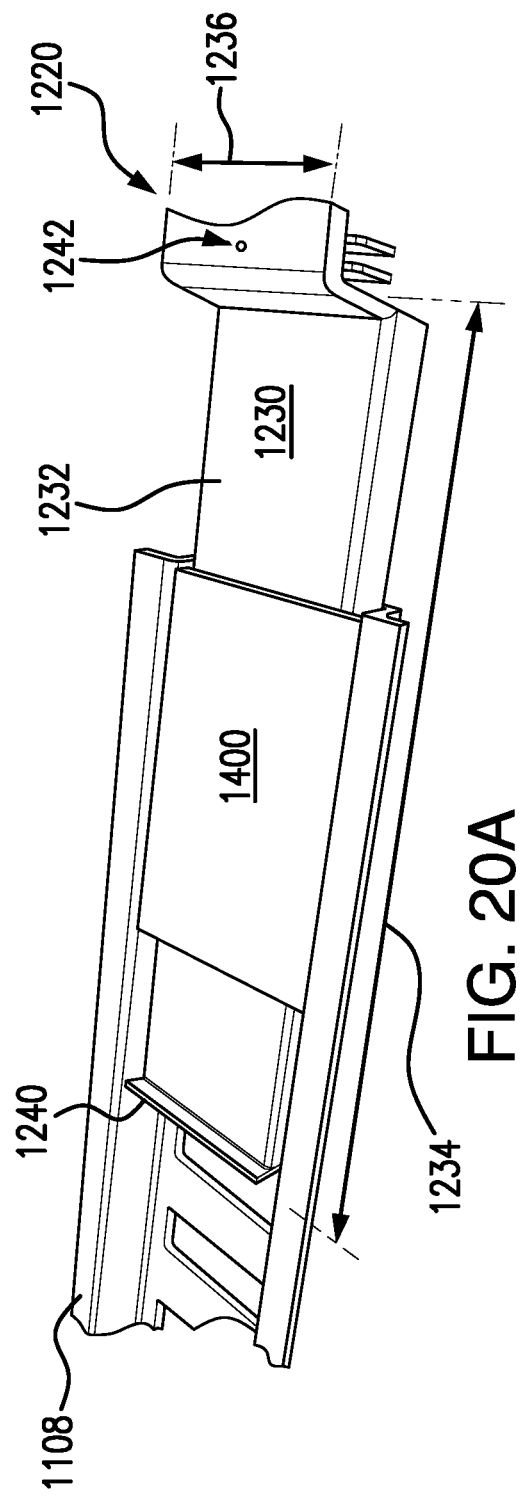
FIGS. 20A-20B illustrate perspective views of an adjustable slide and rotatable clips of a movable and adjustable logistics device according to an aspect of the present invention.
Figure 20B:
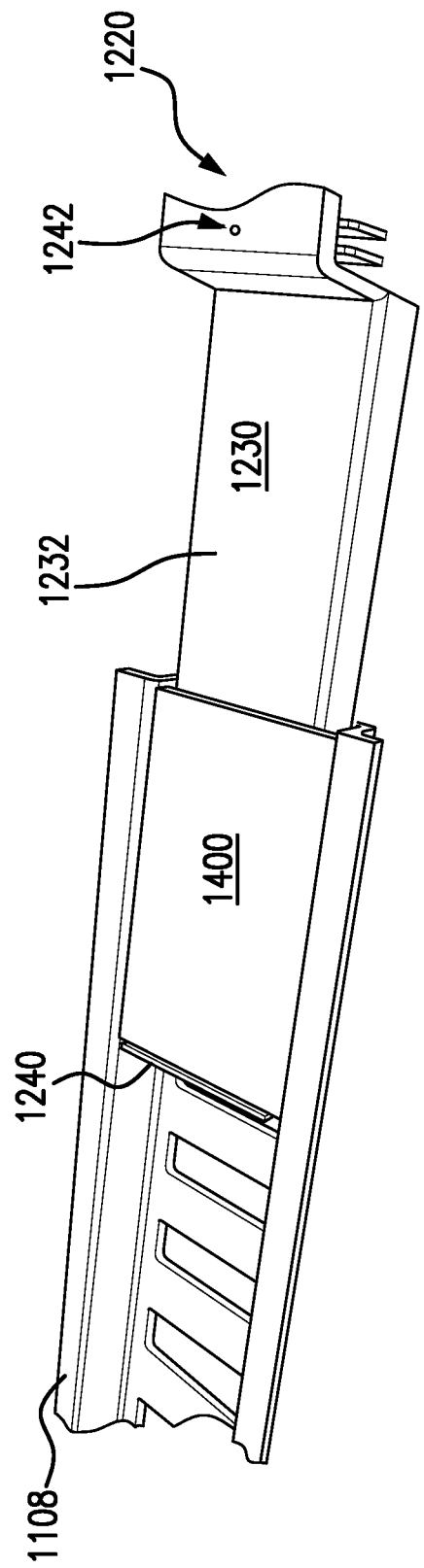

In an aspect, the pivoting clips 1210, 1220 can connect to the horizontal logistic posts 1000 in the same manner as the standard clips 210, 220 as discussed previously in relation to FIGS. 1-17. However, their nature of connection with rail 1108 is varied. In an aspect, the pivoting clips 1210, 1220 can be coupled to the lateral ends 1126 of the rail 1108. In an aspect, when the device 1100 includes an adjustable slide 1230 (as shown in FIGS. 20A-20B), one clip 1210 can be attached to a lateral end 1126 of the rail 1108 and the second clip 1220 may be coupled to/attached to the adjustable slide 1230, wherein the adjustable slide 1230 has substantially the same components of adjustable slide 230 demonstrated in FIGS. 10A-10B. In an aspect, the clips 1200 can be attached through a pivoting mount 1250, as shown in FIGS. 21-24.

In an aspect, the pivoting mount 1250 can include a rail mount component 1260 and a clip mount component 1280, with the rail mount component 1260 mounted to the rail 1108 and the clip mount component 1280 mounted to the clip 1200. In an aspect, the rail mount component 1260 can be coupled to rail 1108 in a pivoting fashion. In one embodiment, the lateral end 1126 of the rail 1108 can include an aperture 1128 configured to receive the rail mount component 1260. In instances of the movable and adjustable logistics device 1100 that include an adjustable slide 1230, an aperture 1242 can be included on the slide 1230 that is configured to receive the rail mount component 1260. In some instances, the aperture 1242 can take the form of an elongated slot 1242 (see FIGS. 27 and 29), which allows the rail mount component 1260 to be adjustably mounted on the slide 1230 for irregular fitting situations between logistic posts 300. In these instances, the rail mount component 1260 include some locking mechanism that can be disengaged to move the rail mount component 1260 with the elongated slot 1242 and then re-engaged when the rail mount component 1260 is in the desirable position (e.g., a locking nut or other known locking mechanisms that function in the manner discussed above).

Figure 21:
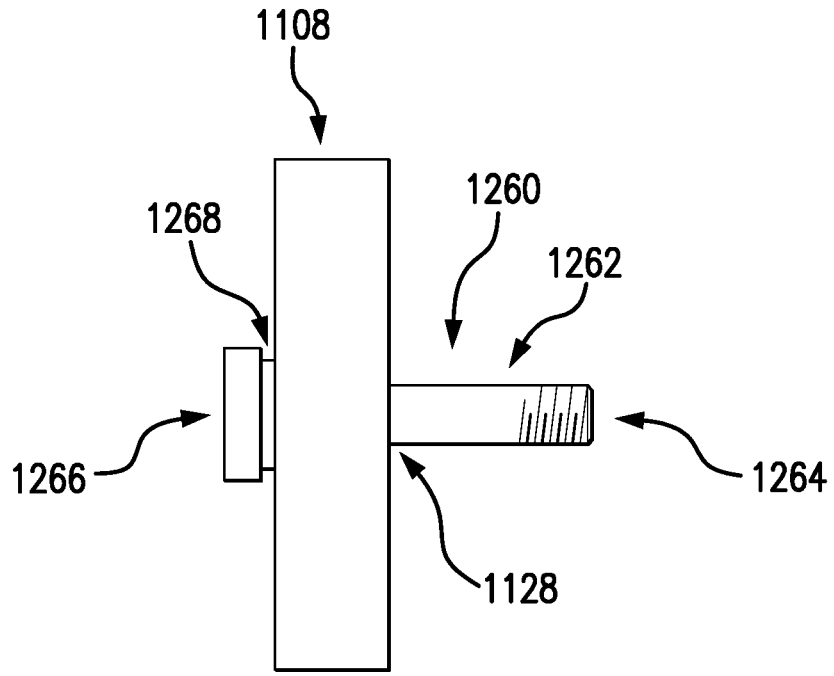
FIG. 21 is a cross-sectional view of a rail mounting component of the movable and adjustable logistics device of FIG. 18.

In aspects, the rail mount component 1260 can include a fastener 1262. The fastener 1262 can include, but is not limited to, rod, bolt (see FIG. 21), or some other member that can rotate within an aperture, or have a portion that rotates. In an aspect, the fastener 1262 is configured to couple to/engage the clip mount component 1280. As shown in FIG. 21, the bolt 1262 can include a threaded end 1264 opposite a head 1266. A washer 1268 can be placed between the head 1266 of the bolt 1262 and the rail 1108 when inserted into the aperture 1128. In addition, spacers (not shown) can be placed on the bolt 1262 between underside of the rail 1108 and the threaded end 1264.

Figure 22:
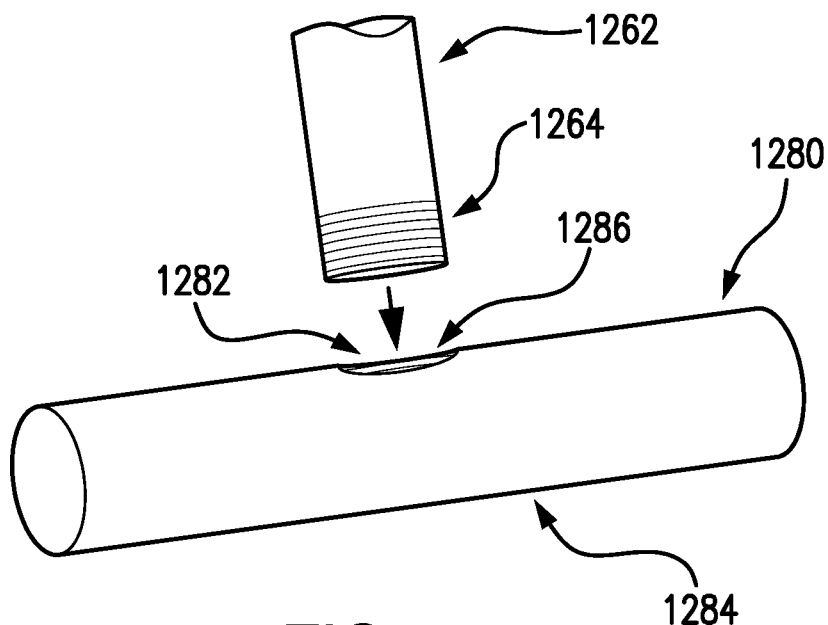
FIG. 22 is a side plan view of a rail mounting component of the movable and adjustable logistics device of FIG. 18 configured to engage a clip mounting component.
Figure 23:
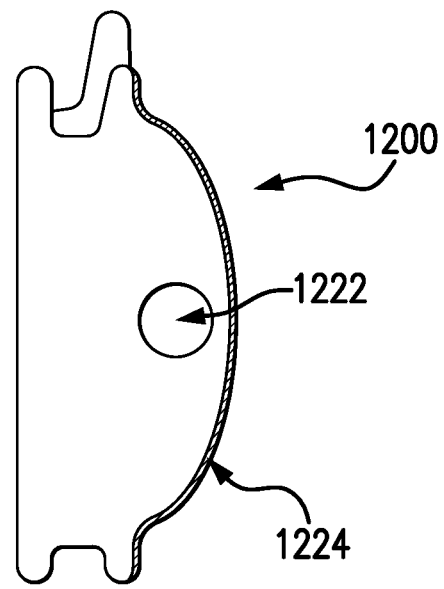
FIG. 23 is a side view of an exemplary clip of the present invention.
Figure 24:
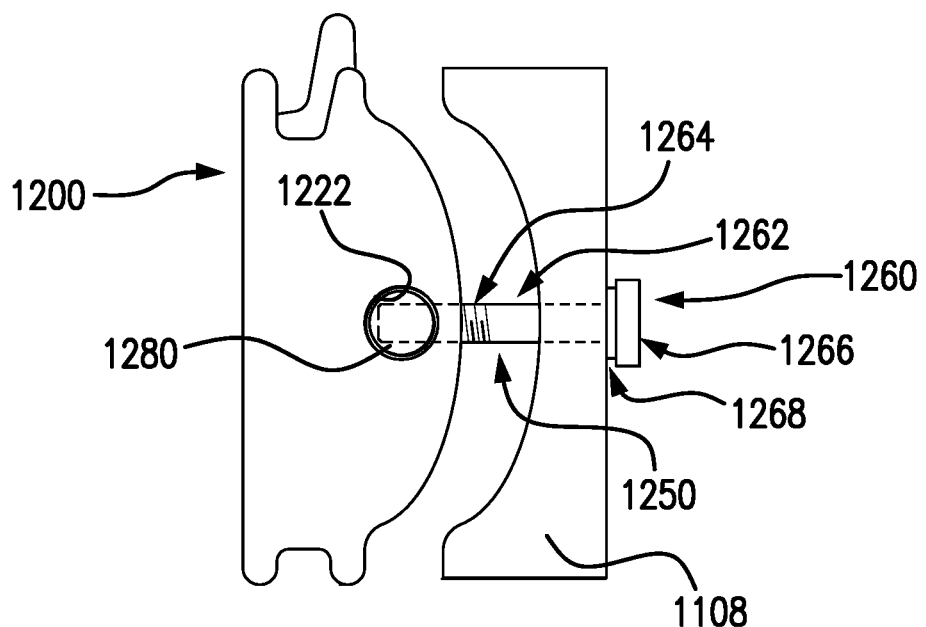
FIG. 24 is a side plan view of an exemplary method of mounting a clip to the rail of the logistics device.
Figure 25:
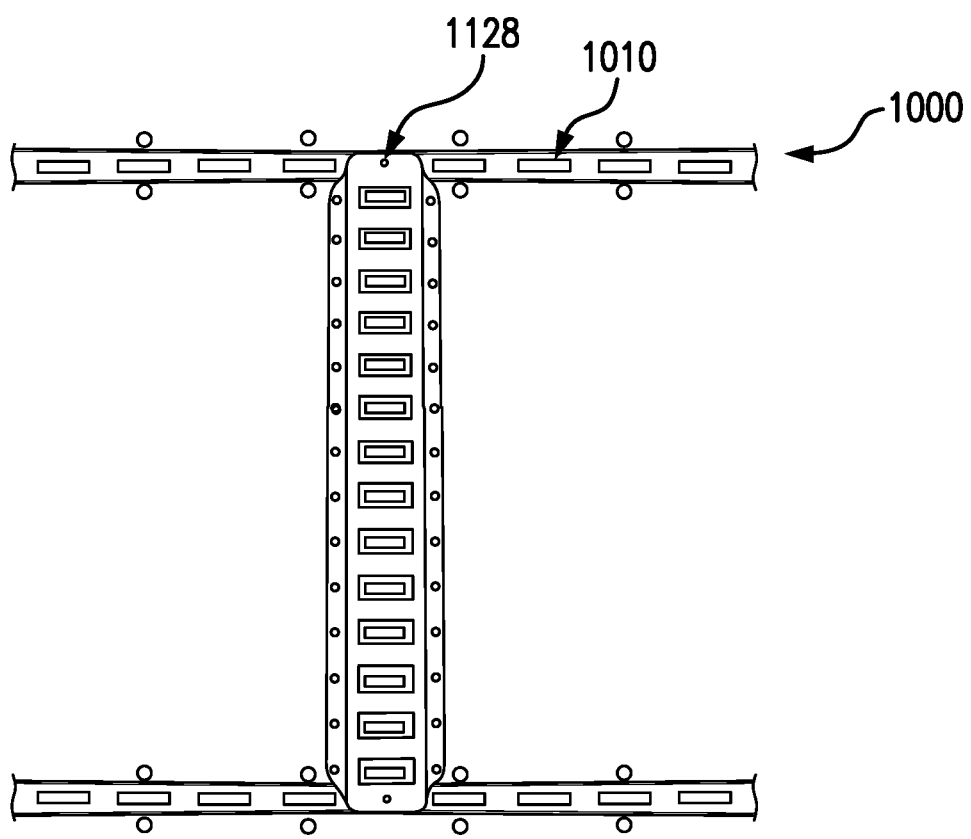
FIGS. 25-26 show plan views of a movable and adjustable logistic device inserted into horizontal and vertical logistics posts, respectively, according to aspects of the present invention.
Figure 26:
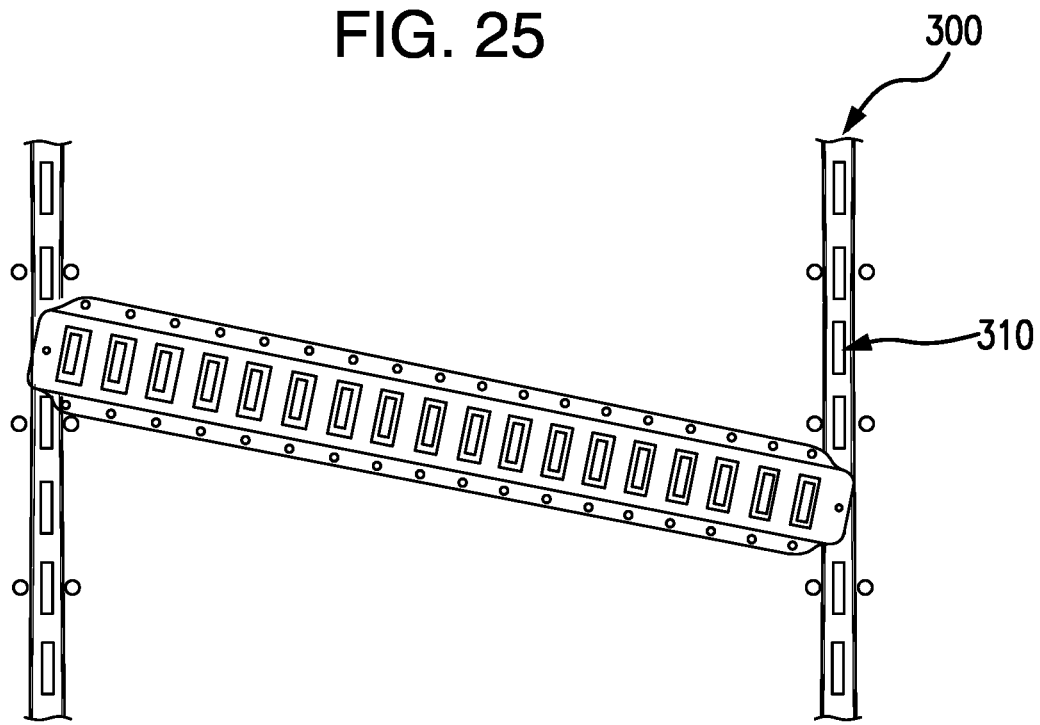
Figure 27:
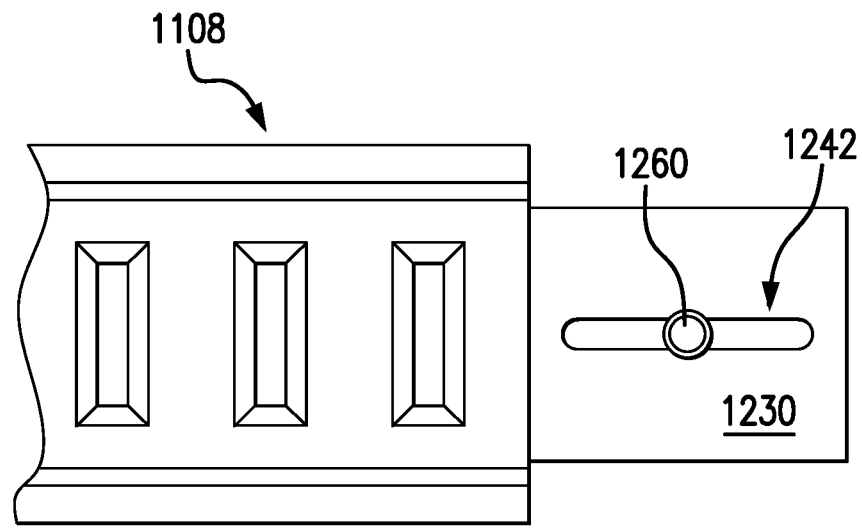
FIG. 27 is a plan view of an adjustable component of the logistic device having an elongated aperture.
Figure 28:
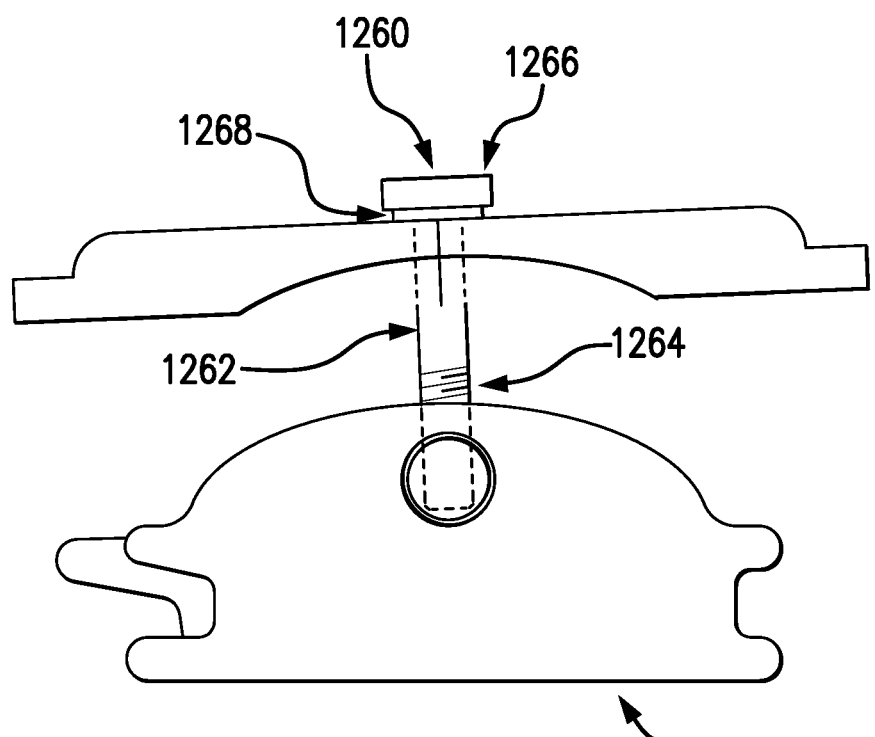
FIG. 28 is a side plan view of an exemplary clip mounted to an adjustable component of the logistic device according to an aspect of the present invention.
Figure 29:
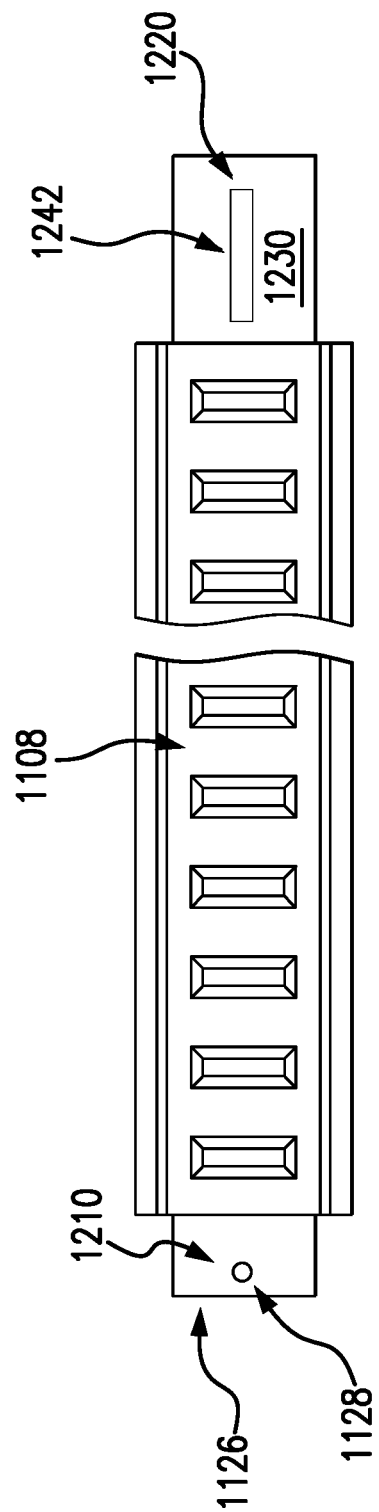
FIG. 29 is a schematic top view of the movable and adjustable logistics device according to an aspect of the present invention.

As shown in FIGS. 22-24, the clip mounting component 1280 is configured to connect the clip 1200 to the rail mounting component 1260. In an aspect, the clip mounting component 1280 can be a rod 1280 that is configured to mate with the clip 1200. The clip 1200 can include an aperture 1222 that retains the rod 1280, as shown in FIGS. 23-24. The rod 1280 can be configured to include an aperture 1282 located approximately at a midpoint 1284, as shown in FIG. 22. The aperture 1282 may extend partially or completely through the rod 1280. In aspects in which the fastener 1262 includes a threaded end 1262, the aperture 1282 can include a matching threaded surface 1286. In aspects in which the aperture 1282 extends completely through the rod 1280, a clip pin/nut may be used to secure the fastener 1262.

In an aspect, the clip 1200 can include as an inner channel 1224 to receive portions of the rail mount component 1260 when being secured to the rod 1280, as shown in FIG. 23. In one such aspect, the inner channel 1224 can be slightly bigger than the diameter of the fastener 1262, keeping the rail mount component 1260 in a substantially static position to prevent its rotation in relation to the clip 1200 and the rod 1280. In another aspect, the channel 1224 can run the length of the clip 1200, which allows the rail mount component 1260 to connect to the rod 1280 while also allowing the rail mount component 1260 to rotate around the rod 1280 and in relation to the notch portions of the clip 1200 once connected.

In an aspect, the movable and adjustable logistics device has been tested to determine the allowable load and tension strength. The dimensions of the tested movable and adjustable logistics device were the following: rail—3 ft, 10 inches; slide—1 ft; an overall extended length of 4 ft, 3⅛ inches; retracted length—3 ft, 11 3/32 inches. The maximum weight of the secured load was 1500 lbs and the maximum allowable strap tension was 1000 lbs at these dimensions. A strengthening plate was added to the back of the rail. Such a strengthening plate reinforces the rail, allowing the horizontal logistics device to withstand higher stress tension and load levels. However, in other aspects, other ranges of loads and strap tension is utilized. And as discussed above, adjusting the length of the slide can modify the load and strap tension limits (i.e., the shorter the length, the increase in the upper limits).

Having thus described exemplary embodiments of the present invention, those skilled in the art will appreciate that the disclosures within are exemplary only and that various other alternatives, adaptations and modifications may be made within the scope of the present invention. Accordingly, the present invention is not limited to the specific embodiments described herein, but is only limited by the following claims.

What is claimed is:

1. A movable and adjustable logistics device comprising:
   a. a rail with a plurality of slots, having a top portion, a bottom portion, a first lateral end, a second lateral end, a first surface and a second surface;
   b. an adjustable slide coupled to and abutting the second surface of the rail, configured to be extended and retracted in order to adjust the horizontal length of the device;
   c. a first clip attached to the first lateral end of the device; and
   d. a second clip attached to the adjustable slide and oriented near the second lateral end of the device, wherein the first and second clip are inserted and removably retained in the receiving spaces of logistics posts, wherein the movable and adjustable logistics device, via the first and second clips, is configured to be mounted between two vertical logistic posts in both a substantially perpendicular relationship with the two vertical logistic posts and in a diagonal relationship with the two vertical logistic posts.

2. The movable and adjustable logistics device of claim 1, wherein the first clip and the second clip comprise pivoting clips that are configured to rotate with respect to the rail.

3. The movable and adjustable logistics device of claim 2, wherein the pivoting clips further comprise pivoting mounts which allow the pivoting of the pivoting clips in relation to the rail.

4. The movable and adjustable logistics device of claim 3, wherein the pivoting mounts comprise a rail mount component and a clip mount component.

5. The movable and adjustable logistics device of claim 4, wherein the rail mount components of the first clip and the second clip are mounted in a pivoting fashion to the first lateral end of the rail and the adjustable slide respectively.

6. The movable and adjustable logistics device of claim 5, wherein the first lateral end of the rail includes an aperture through which the rail mount component of the first clip is mounted.

7. The movable and adjustable logistics device of claim 5, wherein the adjustable slide comprises an aperture through which the rail mount component of the second clip is mounted.

8. The movable and adjustable logistics device of claim 7, wherein the aperture comprises an elongated slot, allowing the second clip to be mounted in an adjustable fashion in relation to the adjustable slide, allowing the movable and adjustable logistics device to address irregular fits between logistic posts.

9. The movable and adjustable logistics device of claim 1, further comprising flanges along the top portion and the bottom portion of the rail.

10. The movable and adjustable logistics device of claim 9, wherein the rail further comprises a support member securely connected to the second surface of the rail, retaining the adjustable slide within the flanges of the rail.

11. The movable and adjustable logistics device of claim 1, wherein the adjustable slide comprises a tray.

12. The movable and adjustable logistics device of claim 1, wherein the adjustable slide comprises a flat rectangular insert.

13. The movable and adjustable logistics device of claim 1, further comprising a strengthening plate securely connected to the second surface of the rail so as not to interfere with the operation of the adjustable slide.

14. A method for securing cargo to receiving spaces of vertical or horizontal logistics posts mounted on a side of a transportation vehicle using a movable and adjustable logistics device, the method comprising:
   a. providing the movable and adjustable logistics device, the movable and adjustable logistics device comprising:
      i. a rail with a plurality of slots, having a top portion, a bottom portion, a first lateral end, a second lateral end, a first surface and a second surface;
      ii. an adjustable slide coupled to and abutting the second surface of the rail, configured to be extended and retracted in order to adjust the horizontal length of the device;
      iii. a first clip attached to the first lateral end of the device in a rotatable manner; and
      iv. a second clip attached to the adjustable slide in a rotatable manner and oriented near the second lateral end of the device;
   b. inserting the first clip into a first receiving space of a first of the two vertical or horizontal logistics posts;
   c. rotating the movable and adjustable logistics device around the first clip until the second clip is near a second receiving space of the second of the two vertical or horizontal logistic posts;
   d. rotating the second clip to align with the second receiving space of the second vertical or horizontal logistics post;
   e. inserting the second clip into a second receiving space of the second vertical or horizontal logistics post; and
   f. securing cargo to the side of the transportation vehicle through at least one of the plurality of slots of the rail.

15. The method according to claim 14, further comprising extending the adjustable slide to fit an irregular gap between the two vertical or horizontal logistics posts before inserting the second clip into the second receiving space.

* * * * *